United States Patent
Li et al.

(10) Patent No.: US 9,155,097 B2
(45) Date of Patent: **\*Oct. 6, 2015**

(54) METHODS AND ARRANGEMENTS FOR BEAM REFINEMENT IN A WIRELESS NETWORK

(71) Applicant: Intel Corporation, Santa Clara, CA (US)

(72) Inventors: Qinghua Li, San Ramon, CA (US); Huaning Niu, Milpitas, CA (US)

(73) Assignee: Intel Corporation, Santa Clara, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 14/021,842

(22) Filed: Sep. 9, 2013

(65) Prior Publication Data

US 2014/0018004 A1 Jan. 16, 2014

Related U.S. Application Data

(63) Continuation of application No. 13/282,459, filed on Oct. 26, 2011, now Pat. No. 8,594,691.

(51) Int. Cl.
*H04W 72/00* (2009.01)
*H04W 72/04* (2009.01)
*H01Q 1/24* (2006.01)
*H01Q 3/30* (2006.01)

(52) U.S. Cl.
CPC ............. *H04W 72/046* (2013.01); *H01Q 1/246* (2013.01); *H01Q 3/30* (2013.01)

(58) Field of Classification Search
None
See application file for complete search history.

(56) References Cited

U.S. PATENT DOCUMENTS

| | | | |
|---|---|---|---|
| 5,434,578 A | 7/1995 | Stehlik | |
| 7,181,246 B2 | 2/2007 | Lo | |
| 7,471,937 B2 | 12/2008 | Simmons et al. | |
| 7,714,781 B2 \* | 5/2010 | Xia et al. | 342/370 |
| 7,898,478 B2 | 3/2011 | Niu et al. | |

(Continued)

FOREIGN PATENT DOCUMENTS

| | | |
|---|---|---|
| JP | 2008-503903 A | 2/2008 |
| KR | 10-2008-0053009 A | 6/2008 |

(Continued)

OTHER PUBLICATIONS

International Search Report and Written Opinion received for PCT Application No. PCT/US2009/069417, mailed on Jul. 29, 2010, 8 pages.

(Continued)

*Primary Examiner* — Long Nguyen
(74) *Attorney, Agent, or Firm* — Schubert Law Group PLLC

(57) ABSTRACT

In some embodiments a beamforming method is disclosed. The method can include transmitting a beam having a channel defined by a maximum ratio transmission vector (MRT) and receiving a first response from a receiver, where the first response has first information such as parameters related to the transmitted beam. Using the parameters and the initial MRT, another directional transmission can be made. A similar process can determine a maximum combining ratio for a receiver. Set up communications between the transmitter and the receiver can be reduced by omitting data from transmission that can be acquired by other means such as from memory or calculations. Additional embodiments are also disclosed.

25 Claims, 4 Drawing Sheets

(56) References Cited

U.S. PATENT DOCUMENTS

| | | | |
|---|---|---|---|
| 7,916,081 | B2 | 3/2011 | Lakkis |
| 7,929,918 | B2 | 4/2011 | Niu et al. |
| 8,068,844 | B2 * | 11/2011 | Li et al. .................. 455/452.1 |
| 8,116,819 | B2 | 2/2012 | Niu et al. |
| 8,594,691 | B2 * | 11/2013 | Li et al. .................. 455/452.1 |
| 2005/0287962 | A1 | 12/2005 | Mehta et al. |
| 2008/0134254 | A1 | 6/2008 | Xia et al. |
| 2008/0232607 | A1 | 9/2008 | Tashev et al. |
| 2009/0231196 | A1 | 9/2009 | Niu et al. |
| 2009/0239565 | A1 | 9/2009 | Han et al. |
| 2010/0103045 | A1 | 4/2010 | Liu et al. |

FOREIGN PATENT DOCUMENTS

| | | |
|---|---|---|
| TW | 200746678 A | 12/2007 |
| TW | 200810416 A | 2/2008 |
| WO | 2007/103108 A2 | 9/2007 |
| WO | 2010/078193 A2 | 7/2010 |
| WO | 2010/078193 A3 | 10/2010 |

OTHER PUBLICATIONS

Y. Tang, B. Vucetic, and Y. Li. "An Iterative Singular Vectors Estimation Scheme for Beamforming Transmission and Detection in MIMO Systems," IEEE Communications Letters, vol. 9, No. 6, pp. 505-507, Jun. 2005.

Office Action received for Taiwan Patent Application No. 098145099, mailed on May 31, 2013, 4 Pages of Office Action and 7 Pages of English Translation.

Office Action received for European Patent Application No. 09837042.2, mailed on Jul. 28, 2011, 2 Pages.

Office Action received for Korean Patent Application No. 10-2011-7018032, mailed on Aug. 21, 2012, 3 Pages of Korean Office Action and 2 Pages of English Translation.

Notice of Allowance received for U.S. Appl. No. 12/317,968, mailed on Jul. 18, 2011, 11 Pages.

Non-Final Office Action received for the U.S. Appl. No. 13/282,459, mailed Feb. 16, 2012, 7 Pages.

Notice of Allowance received for U.S. Appl. No. 13/282,459, mailed on Oct. 4, 2012, 7 Pages.

Notice of Allowance received for U.S. Appl. No. 13/282,459, mailed on Jul. 23, 2013, 8 Pages.

Notice of Allowance received for U.S. Appl. No. 13/282,459, mailed on Apr. 1, 2013, 8 Pages.

Notice of Allowance received for Chinese Patent Application No. 200911000147.6, mailed on Sep. 9, 2014, 2 Pages of Notice of Allowance and 3 Pages of English Translation.

Office action received for Chinese Patent Application No. 200911000147.6, mailed on Nov. 11, 2013, 3 Pages of Office Action and 4 Pages of English Translation.

Office Action received for Chinese Patent Application No. 200911000147.6, mailed on Apr. 22, 2014, 3 Pages of Office Action and 4 Pages of English Translation.

Office Action received for Chinese Patent Application No. 200911000147.6, mailed on Jul. 31, 2012, 5 Pages of Office Action and 2 Pages of English Translation.

Office Action received for Chinese Patent Application No. 200911000147.6, mailed on Apr. 18, 2013, 3 Pages of Office Action and 4 Pages of English Translation.

Office Action received for Japanese Patent Application No. 2011-544514, mailed on Dec. 25, 2012, 3 Pages of Office Action and 2 Pages of English Translation.

International Preliminary Report on Patentability and Written Opinion received for PCT Patent Application No. PCT/US2009/069417, mailed on Jul. 14, 2011, 5 Pages.

Xiaoyan et al., "A New Optimal Transmit and Receive Diversity Scheme", IEEE Pacific Rim Conference on Communications, Computers and signal Processing, Victoria, BC, Aug. 26-28, 2001, pp. 538-541, vol. 2.

Notice of Allowance received for U.S. Appl. No. 12/317,971, mailed Oct. 6, 2011, 11 pages.

Non-Final Office Action received for the U.S. Appl. No. 13/348,325, mailed May 21, 2012, 15 pages.

Final Office received for U.S. Appl. No. 13/348,325, mailed Feb. 14, 2013, 12 pages.

Extended European Search Report received for European Patent Application No. 09837042.2, mailed on Apr. 30, 2015, 10 pages.

Love, et al., "Quantized Maximum Ratio Transmission for multiple-Input Multiple-Output Wireless Systems", IEEE, Conference Record of the Thirty-Sixth Asilomar Conference on Signals, Systems and Computers, vol. 1, ISBN: 978-0-7803-7576-9, 2002, pp. 531-535, Pacific Grove, CA, USA.

* cited by examiner

METHODS AND ARRANGEMENTS FOR BEAM REFINEMENT IN A WIRELESS NETWORK

FIELD OF INVENTION

The present disclosure is related to the field of wireless communication, and more particularly, to the field of beamforming between a network controller and a device.

BACKGROUND

In a typical wireless network, many devices can enter an area serviced by a wireless controller and communications can be set up between the devices and the controller. In state of the art systems, significant overhead features and functions are required to connect a device to a network. To facilitate an efficient set up between multiple networkable devices, communications must be effectively configured and managed. Thus, a typical wireless network has a communications coordinator or controller such as an access point, a piconet controller (PNC), or a station that configures and manages network communications. After a device connects with the controller, the device can access other networks, such as the Internet, via the controller. A PNC can be defined generally as a controller that shares a physical channel with one or more devices, such as a personal computer (PC) or a personal digital assistant (PDA), where communications between the PNC and device(s) form the network.

The Federal Communications Commission (FCC) limits the amount of power that network devices can transmit or emit. Due to the number of networks, crowded airways, requirements to accommodate more devices and the low power requirements, new wireless network standards continue to be developed. Further, it is known that the path loss for systems that transmit at 60 G Hz is very high. Complimentary metallic oxide semiconductors (CMOS) are popular for manufacturing network components due to their low cost and low voltage requirements and a CMOS type power amplifier is inefficient at such frequencies. Generally, most low power 60 gigahertz (GHz) communication systems require directional beam formed systems to achieve acceptable signal to noise ratios (SNR)s and hence, acceptable communication performance.

Accordingly, there has been a lot of activity to develop low power network communications in the 60 GHz range utilizing directional communications via millimeter waves. An omni-directional transmission or communication is different from a directional transmission, as an omni-directional transmission generally has a single antenna that provides a point source of radiation. A point source has a radiation pattern where signal energy propagates evenly in a spherical manner unless obstructed by an object. In contrast, a directional communication can focus a signal or steer a signal towards a target and a receiver can focus its sensitivity or steer its sensitivity towards a source. In order to accurately steer, transmit and receive beams in the proper direction, a beamforming process or training process can be implemented between a controller and a device. To achieve directional communications several different directional transmission methods are available. One such method utilizes a sectored antenna approach, which switches signals among several predetermined beams. This method can utilize a phased antenna array where transmit and receive beams are formed by changing the phases of the input and output signals of each antenna element. Another approach distributes the transmit power to multiple power amplifiers and, based on the gain of the power amplifiers, the beam can be adaptively steered.

Beamforming is important for reliable operation of new, state of the art, high frequency low power networks. It can be appreciated that traditional omni-directional transmissions/communication topologies cannot provide reliable low power, high data rate communications at distances of over a few meters. Generally, directional antennas or antenna arrays can provide gains that are much higher than omni-directional antennas (tens of decibels). When a transmitter accurately focuses signal energy in the direction of the desired receiver and a receiver focuses it's receive sensitivity in the direction of the transmitting source, interference from other directions can be mitigated and the beamformed system will create less interference for other systems.

A directional transmission system can provide improved performance over omni-directional systems due to the increased signal strengths between devices and decreased interference from devices transmitting from directions where the receiver is less sensitive. Higher data rates, on the order of a few Gigabits per second, are possible in a directional transmission mode since the directional link benefits from higher antenna gains. However, these directional systems are typically more complex, slower to set up and more expensive than traditional omni-directional transmission systems. After an association and beam calibration process, efficient data exchange between the device, the controller and other networks, such as the Internet, can occur.

It can be appreciated that many network environments, such as offices, office buildings, airports, etc., are becoming congested at network frequencies as many devices enter a network, exit the network and move in relation to the controller of the network. Setting up directional communication and tracking movement of devices in traditional systems requires a relatively long, inefficient association time and set up time for each device. Such continued increase in the number of users for an individual network, the increase in set-up complexity and overhead continue to create significant problems.

BRIEF DESCRIPTION OF THE DRAWINGS

Aspects of the invention will become apparent upon reading the following detailed description and upon reference to the accompanying drawings in which, like references may indicate similar elements.

DETAILED DESCRIPTION OF EMBODIMENTS

Figure 1:
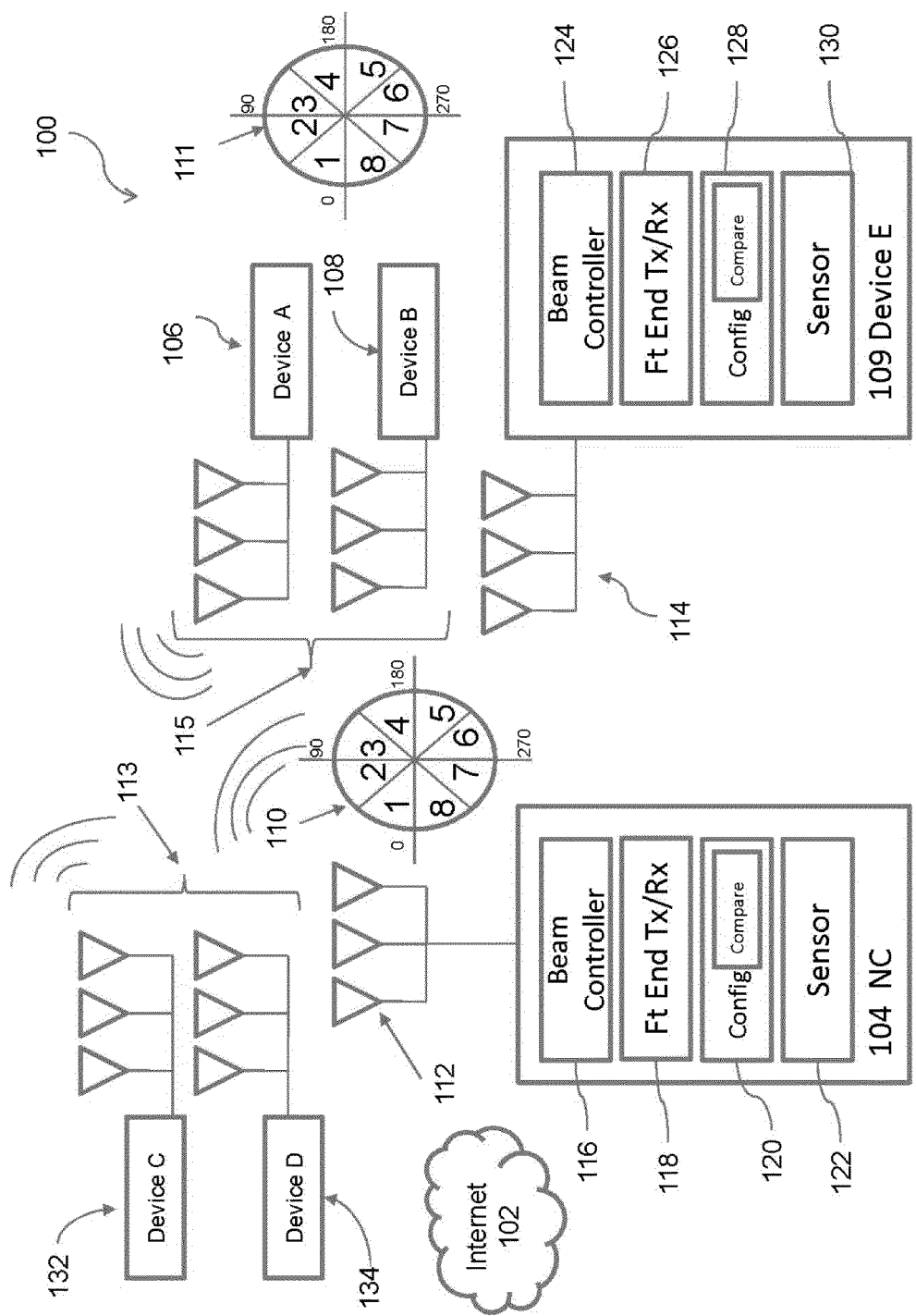
FIG. 1 is a block diagram of a network that can set up network communications.

The following is a detailed description of embodiments of the disclosure depicted in the accompanying drawings. The embodiments are in such detail as to clearly communicate the disclosure. However, the amount of detail offered is not intended to limit the anticipated variations of embodiments. The description that follows is for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the disclosure may be practiced in versions that depart from these specific details. In certain instances, descriptions of known devices, circuits, and methods are omitted so as not to obscure the description of the claimed embodiment with unnecessary detail. The intention is to cover all modifications, equivalents, and alternatives falling within the spirit and scope of the present disclosure as defined by the appended claims.

In some embodiments, it is desired to form beams prior to directionally transmitting data between a device and a network controller. Most beam training utilizes an iterative process where beams are directed to desirable positions based on parameters that affect the channel such as direction, distance obstructions, etc. The iterative process can include determining relative directions, transmitting symbols, monitoring performance parameters in response to the transmission, calculating weights and selectively making additional transmissions based on previously acquired data. Monitoring transmission parameters of selective transmissions can provide insight on what future channel adjustment can yield improved communications.

Accordingly, channel properties acquired by monitoring a variety of successively transmitted beams can provide information on how to improve directional communication performance. In accordance with some embodiments, iterative transmissions can be simplified to disclose desirable data without wasting time and energy that will create data that is already known or can be determined via calculations. Such as process that omits unnecessary transmissions can converge more quickly and efficiently on an acceptable link. The beam can be controlled by adjusting amplifier gain settings and phase delays for each feed path of an antenna array.

With many different paths, amplifiers, and phase shifters, it can be appreciated that a code book or algorithm that provides good adjustments based on good measurements can quickly determine controls that provide acceptable communication channels. Thus, changes to the beam control signals or control vectors and weights are desired that are tailored to correct for channel conditions that are out of the specified limits without degrading other parameters beyond acceptable limits. Such control features allow a system to quickly converge on an acceptable beamform setting. During the training process, the weights can be gradually refined during multiple iterations of the disclosed beam refinement process. After making adjustment to the beam by modifying beamforming weights or control settings and testing such settings, it can be determined when an acceptable channel performance has been achieved. In some embodiments, when predetermined criteria are met such as when the transmit vector and the receive vector converge or "point at each other" it can be assumed that an acceptable channel has been achieved and the beamforming process can terminate. After acceptable control settings or weights are determined, the weights can be stored and utilized every time the devices communicate.

It can be appreciated that if a connected network device moves in relation to a controller (for example, when someone moves to another seat at an airport or a library), or a communication channel is dropped, the beamforming process must again be conducted. A typical beamforming process can take in excess of 400 microseconds and network communications can be interrupted for an unacceptable amount of time. It can be appreciated that for a busy network controller, it is very desirable to reduce the beamforming training overhead as much as possible.

In accordance with the disclosed arrangements, each beamform training iteration can include two steps and data acquired in previous steps such as the first step can be utilized in subsequent steps, such as the second step. For example, vector or channel data can be obtained from a first step, and such data can be utilized to determine maximum ratio combining (MRC) weights, and acquired data can be utilized in the determination of maximum ratio transmission (MRT) weights. Optimal MRC weights can define an "optimal" receiver sensitivity beam and optimal MRT weights can define an "optimal" transmit beam.

Generally, to find MRC weights, "diversity combining" can be conducted where the signals levels from each antenna channel can be added together and the gain of each channel can be made proportional to the root mean square (RMS) signal level. In addition, the gain of each channel can be set to a value that is inversely proportional to the mean square noise level in the channel. Different proportionality constants can be utilized for each channel. As stated above, the MRC determination can indicate a receive sensitivity vector that maximizes receiver sensitivity in the direction of the transmitting source. The MRC can also be referred to as ratio-squared combining and pre-detection combining.

Solving for the MRT weights can indicate a transmit beamforming vector that "maximizes" the signal power directed towards the receiver. In an MRT weight analysis, a controller can adjust complex weights that control attributes of the transmission paths to compensate for downlink channel gains in order to produce signal reinforcement—diversity—at the network device. Such an adjustment can be accomplished, even though the receiver may only have a single antenna. To make the method adaptive, the complex weights can be obtained from the instantaneous complex gains in the uplink, however, the delay and frequency offset between uplink measurements and downlink transmission can reduce the correlation between the gains in the two directions (transmit and receive). The negative effects to the end result of gain de-correlation, multiple antennas and the effect of fading in a multiple user system can be minimized by utilizing the disclosed arrangements. Accordingly, quality communications controls can be achieved even when low downlink transmit power is utilized.

As stated above, successive iterations (calculations) can utilize past results (from past calculations) and the successive iterations can provide improved values that provide improved MRT and MRC weights. A single data stream can be assumed when calculating the MRC and MRT weights. However, calculations for multiple data streams could be performed with minor modifications to the disclosed arrangements. The disclosed arrangements can reduce the amount of time, energy, resources, overhead, etc., required to accomplish the burdensome training overhead required to achieve acceptable communication channels. Currently, the most efficient beam refinement method in state of the art 60 GHz wireless systems is a power iteration process defined in draft specifications. The disclosed arrangements improve on the power iteration by reducing training overhead with minimal additional hardware by utilizing data from previous iterations.

In some embodiments, the disclosed arrangements can bypass redundant portions or un-useful portions of the training process utilized by traditional directional systems. Such bypassing can be accomplished by focusing training patterns in the iteration process on patterns that will disclose possible improvements for areas of the channel that have less than perfect performance or areas that need improvement. The disclosed arrangements can configure different transmission protocols based on transmit channel quality and receive channel quality. More specifically, after an initial calibration such as a sector sweep, or course adjustment, the number of training symbols transmitted in the beam refinement process (both the device and controller) can be reduced from $N_t$ to $N_t-1$.

In traditional systems, training for a single transmit antenna in an array produces a weight for each transmit antenna for each iteration. Such a process is "overkill" and thus inefficient. In accordance with the present arrangements, such effort does not have to be expended. Moreover, reducing the beamforming effort can reduce the beam training overhead. Useable beamforming weights for the receiver and transmitter can be denoted by vectors u and v. In one pass, the controller can be the transmitter and the device can be the receiver and, in another pass, the controller and device can change places and the device can be the transmitter and the controller can be the receiver.

As implied above, arrangements in the form of systems, apparatuses, methods and computer readable media are disclosed that can provide efficient set up and communication between a network communication controller (NC) and one or more devices in a wireless network. Communication set up and management for a wireless network can include processes such as beaconing, device discovery, location detection, probing, association requests, association acknowledgements, authorization requests, authorization acknowledgements, beamforming and other overhead functions.

It can be appreciated that a relative location of a device with respect to a controller will not be known when a device enters an area serviced by a controller. In a busy network, it is desirable to conduct an efficient device connection process that can quickly determine relative directions such that beamforming control vectors or parameters can be quickly and accurately determined. Such a setup process can include a "sector sweep" to determine general location relationships between a device and a controller followed by a training sequence or beam refinement process (training) where beams are accurately focused. The disclosed arrangements provide fast and efficient beam refinement arrangements by tailoring the training process based on the quality of the channel as determined by or measured in a previous phase.

To address such a set up, several standardization bodies including IEEE 802.15.3c, ECMA TG20, WiHD, NGmS and 802.11 VHT are reviewing and/or working on standards to set up network communications for networks utilizing gigabytes per second (Gbps) 60 GHz or millimeter wave communications. Generally, the path loss for transmission in the 60 GHz range is very high and therefore, directional transmission of data is important to achieve the desired 10 meter coverage. In addition, the array gain from transmit and receive beamforming is important to achieve the signal to noise ratio (SNR) that is desired for reliable data communications.

To implement low power gigahertz communications, a device and controller with a phased antenna array can acquire parameters and learn what directional, beamed transmissions provide acceptable results. Prior to providing such directional transmissions, control vectors that control the beam can be determined during an iterative learning process. This learning process can include a directional search and directional data acquisition or a beam search and acquisition process. When control functions are determined that can provide acceptable and often optimal SNRs for network transmissions, the beam training process can be terminated and data communications can begin. Current or state of the art beam search and refinement topologies that are being developed and refined by standard committees for phased array antennas are based on an comprehensive iterative approach where the comprehensive process is performed for every case at every step regardless of current channel performance (i.e. the process is the same even if the channel is best case or worst case).

This traditional process that "assumes" worst case mentality unnecessarily consumes significant time, energy and resources even in systems with only one omni-receiving antenna. The standardized beam search can start with a sector sweep to determine a general relative direction between a device and a controller and then, beam refinement steps that solve worst case conditions are continuously executed. It can be appreciated that after a general beam direction is acquired by a controller and a device, often the channel conditions are good and, in accordance with the present disclosure, the beam refinement process can be tailored to the "good" channel conditions thereby reducing the time to complete the channel set up.

In accordance with the disclosed arrangements, if a controller and a device both have phased arrays that are well calibrated, an acceptable communication channel can be formed with a small subset of the standard or traditional refinement process. Thus, channel parameters can be monitored and a subsequent step of the beam refinement process can require minimal time and energy yet provide significant knowledge or improvements to the channel conditions. Such a tailored, reduced set up process can greatly reduce the overhead of a wireless network. However, in some circumstances, such as where a sector sweep tests minimal sectors and the phased arrays or front ends are not calibrated, significant beamform training or refinement may be necessary. Accordingly, tailoring the beam refinement process based on detected channel conditions or acquired channel parameters is disclosed herein to achieve high speed network communications.

Many embodiments are disclosed that allow for efficient set up for network communications. In one embodiment, a beamforming method can include performing sequential beam transmissions in multiple directions and receiving a reply to the sequel beam transmissions transmitted by the device receiving the sequential transmissions. The reply transmissions can include parameters related to the original transmission such as direction of arrival, signal to noise ratio (SNR), signal to interference plus noise ratio (SINR), signal strength, etc., as determined by the receiver. Utilizing data from previous processes and the feedback, the transmitter can determine and store vectors that control the beam in the appropriate direction. The transmitter can also determine a tailored "test sequence" for the next training step based on feedback. Then, based on results or data from one or more previous iterations, the control vectors can again be refined/adjusted or calibrated. The tailored training steps can acquire parameters from a transmission having a minimum set of symbols transmitted in a specific direction, and the parameters can be utilized to improving beam control and hence, channel conditions.

In some embodiments, after a transmitter acquires one or more communication parameters, the parameters can be compared to stored parameters, metrics or predetermined parameter limits and, when the one or more acquired parameters are within a specific range or are at, above or below these predetermined limits, the beamforming process can terminate and high speed network communications can be conducted. Such usage of existing parameter data and monitoring to determine when to terminate can improve on existing beamforming processes Thus, if the monitoring indicates that a less than desirable SNR exists, a maximum training process may be conducted, however if monitoring indicates a desirable SNR or SINR, some level of a reduced training process can be implemented.

More specifically, if the monitoring indicates that a beam in a specific direction will provide an acceptable communication channel and there are calibrated arrays, then the beam training process can be significantly reduced. Thus, the detected parameters can dictate which tailored beam training process is implemented, thereby significantly reducing the overhead for wireless networks.

Multiple schemes are disclosed herein that can gather information on channel conditions and, based on the channel conditions, tailored beamform calculations can be made to produce useful data. In some embodiments, a SNR and/or SINR for a channel can be estimated and, based on this estimation, the overhead required to complete the beam training process can be significantly reduced. In some embodiments, it can be determined if one or both of the arrays are calibrated and the analysis can be tailored accordingly. In some embodiments, a process for completing the beamforming set up can be selected based on that previously determined information. In some embodiments, channel information can be sent explicitly or implicitly by the transmitter without the knowledge of receiver data. For example, the transmitter may explicitly send a message to the receiver saying that the transmit and/or the receive antenna array(s) at the transmitter is calibrated.

In another example, the transmitter may send different training sequences to implicitly indicate the calibration conditions: calibrated transmit, calibrated receive, un-calibrated transmit, and un-calibrated receive antenna arrays. When calibration information of one device is estimated by the other device, the SNRs or SINRs obtained from the sector sweep can be utilized for the estimation. For example, if one sector has a SNR that is significantly higher than other sectors, a receiver utilizing an omni-directional receiver may believe the transmit antenna array is calibrated. After calibration information is acquired, the beam training sequence used in the subsequent training process can be optimized and selected accordingly.

In some embodiments, a first pass at training can be performed based on previously acquired system information then, the same or additional system information can be acquired during the first exchanges and such information can be utilized to select or determine sequence to be utilized during a subsequent pass. Such an iterative process can quickly form beams that provide acceptable, possibly optimized communications. Alternately stated, after the first training process is selected and implemented, additional transmissions can be made, additional parameters can be acquired and another training process can be selected and implemented based on this second iteration. Even though more calculations are conducted, some transmissions can be reduced or eliminated, thus reducing overhead and set up time for most wireless networks.

Referring to FIG. 1, a basic configuration of a wireless network (WN) 100 is illustrated. The WN 100 can include a first network controller NC 104, device A 106, device B 108, device C 132, device D 134 and a device that desires to join the network, device E 109. Each device can have a steerable antenna system illustrated by antenna arrays 112, 113, 114 and 115. NC 104 and device E 109 can include a beam controller 116 and 124, a front end or a transceiver (TX/RX) 118 and 126, a compare/configuration module 120 and 128 and sensor modules 122 and 130. Although NC 104 and device E 109 are shown with an antenna array (112 and 114) other hardware, such as more or less antennas or a single highly directional antenna, could be utilized. NC 104 can facilitate a communication set up between NC 104 and devices such as device A 106, B 108, C 132, D 134 and E 109. It can be assumed that NC 104 is located in proximity to devices (less than 15 meters), such as device E 109, and that device E 109 can detect NC's 104 non-directional set up transmissions and NC 104 can detect device E's 109 non-directional set up transmissions.

The WN 100 could be a wireless local area network (WLAN) or a wireless personal area network (WPAN) or another network that complies with one or more of the IEEE 802 set of standards. NC 104 can be connected to one or more networks such as the Internet 102. In some embodiments, the WN 100 could be a piconet that defines a collection of devices with a piconet controller that occupies shared physical channels with the devices. In some embodiments, a device such as a personal computer can be set up as NC 104 and the remaining devices A 106, B 108, C 132, D 134 and E 109 can then "connect" to the WN 100 via control/management functions, such as beamforming, that can be efficiently administrated by NC 104.

The disclosed system 100 can adapt the beamform training sequence based on channel conditions. Calculations can be made by the controllers and when data is needed for the calculations the data can be acquired utilizing methods other than "recipe" based transmissions. The disclosed system can dramatically improve the overall system startup efficiency compared to traditional systems. In some embodiments, front end transceiver (TX/RX)s 118 and 126 and beam controllers 116 and 124 can perform omni-directional and directional transmissions during sector sweeps or during sequence transmissions as part of iterative training steps.

In some embodiments the front end transceiver 118 can transmit training routines and based on what is received device E 109 can send a transmission back (i.e. provide feedback) that indicates a measured, beamformed channel gain. In other embodiments, for a given MRC vector, the receiver can quantizes the MRT vector and feeds values for the MRT vector back to the transmitter. The transmitter can then compute one or more components in the fed back MRT vector that are orthogonal to the previous MRT vector. Generally the entire channel matrix is not observable/available in the system but some information about the channel matrix is available from an iteration. The disclosed arrangements desire to minimize the amount and duration of each iteration and can accomplish this by minimizing transmissions that send data that is available by other means. Thus, the transmitting information that overlaps is minimized or transmitting overlapping data is done as little as possible so that the total amount of information exchanges in an iteration can be maximized.

During the training transmissions sensors 122 and 130 can measure communication parameters and can assist in determining maximum ratio combining (MRC) weights and maximum ratio transmission (MRT) weights. The data acquired by the sensors 122 and 130 can be utilized by the configuration/compare modules 120 and 128 that can calculate how to improve channel performance and, based on the calculations configuration/compare modules 120 and 128, can determine MRC weights and MRT weights. Subsequent sequence transmissions can be customized based on the estimated MRC and MRT weights to significantly reduce the setup time and overhead for a device entering the network. The calculation of weights using information that traditional systems discard can often reduce the required transmissions to a subset of the transmissions required by current beamform training systems. Even state of the art training systems currently being specified by committees do not use data that was acquired in previous iterations. Thus, transmissions that would traditionally be made to acquire channel parameters can be omitted when past channel parameters are utilized in the training analysis.

It can be appreciated that the NC 104 can support communication setup and communications with most wireless technologies including wireless handsets such as cellular devices, hand held, laptop or desktop computing devices that utilize WLAN, Wireless Mobile Ad-Hoc Networks (WMAN), WPAN, Worldwide Interoperability for Microwave Access (WiMAX), handheld digital video broadcast systems (DVB-H), Bluetooth, ultra wide band (UWB), UWB Forum, Wibree, WiMedia Alliance, Wireless High Definition (HD), Wireless uniform serial bus (USB), Sun Microsystems Small Programmable Object Technology or SUN SPOT and ZigBee technologies. The WN 100 can also be compatible with single antenna, sector antennas and/or multiple antenna systems such as multiple input multiple output systems (MIMO).

In operation, device E 109 can enter the network region or can be powered up in the region. Device E 109 can listen for a periodic beacon transmission made by NC 104. Based on receipt of the beacon transmission, device E 109 can transmit an association request signal to the NC 104 as the beam training process can begin. Generally, the NC 104 and device E 109 can monitor and utilize specific frequencies for transmitting the beacon and the beacon can contain network timing assignment information that can be utilized to synchronize transmissions for the beamforming process. In some embodiments, when device E 109 is attempting to join the network 100, the device E 109 and the NC 104 can implement a sequence length during beamforming after determining a link budget and a quality of array calibration.

Initially, the configuration/compare module 120 can control the front end module 118 and the beam controller 116 to transmit beams in different sectors via sequential transmissions. This can be referred to as a sector sweep. Sector map 110 has divided up the relative directions around the NC 104 into eight sectors. Device E 109 can be assigned time slots and can store the sector sequence and using such information can acquire parameters of the transmissions in each sector. The number and orientation of the sectors is not a limiting feature as more sectors or less sectors or nearly any orientation could be utilized. During the sector sweep, the front end 126 of the device E 109 can receive the signals of the sector sweep and the sensor 130 can detect or acquire parameters of possible channels. Although not required, to start the beam training process, the configuration module 120 can control the front end module 118 and the beam controller 116 to transmit beams in different sectors via sequential transmissions. This can be referred to as a sector sweep. Sector map 110 has divided up the relative directions around the NC 104 into eight sectors. Device E 109 can be assigned time slots and can store the sector sequence and using such information can acquire parameters of the transmissions in each sector. The number and orientation of the sectors is not a limiting feature as more sectors or less sectors or nearly any orientation could be utilized. During the sector sweep, the front end 126 of the device E 109 can receive the signals of the sector sweep and the sensor 130 can detect or acquire parameters of possible channels.

It can be appreciated that, when NC 104 transmits in sectors 1, 2, 7 and 8, device E 109 may not be able to receive an intelligible signal and the SNR of the transmission made by NC 104 in these sectors can be estimated or determined by sensor 130 as poor, undesirable or unacceptable. In some embodiments, the sensor 130 can send the acquired sector related data to the configuration/compare module 128 and the configuration/compare module 128 can compare the acquired data to predetermined metrics and can rank the sectors and determine which sector has the best communication parameters. The configuration/compare module 128 can then initiate a transmission back to the NC 104 indicating which sector appears to provide the best communication properties.

In one example, sensor 130 can receive a transmission sent by NC 104 in sector 5 and configuration/compare module 128 can determine that transmissions by NC 104 in sector 5 have a very high or desirable SNR ratio. Device E 109 can send this information to the NC 104 and, after the sector sweep, further beam refinement processing can be commenced. In sector transmissions where a very low SNR is determined, these sectors can be tagged as undesirable sectors.

In a similar process, the configuration/compare module 128 of device E 109 can control front end module 126 and the beam controller 124 to transmit or receive beams in different sectors via sequential transmissions based on the determined MRT and MRC. Device sector map 111 can be utilized by device E 109 to organize a sector sweep. A sector sweep can be conducted by NC 104 and/or device E 109 by controlling the array. NC 104 can store the sector index, the training sequence, and timing arrangements and can acquire parameters of transmissions made by device E 109 in each sector using such synchronization data. During the sector sweep, the front end 118 of the NC 104 can receive the signals of the sector sweep and the sensors 122 and 130 can detect or acquire parameters of potentially acceptable channels and these parameters can be sent back to the device E 109 and device E 109 can use these parameters to improve the beam and correspondingly, the communication channel. Generally, the sector sweep can allow the transmitter to determine the relative direction of the target receiver and can allow the receiver to determine a direction of arrival from transmitter. Such a parameter allows the gain of the transmitting and receiving antenna array to be "optimized" in the relative direction of the transmitting source. The configuration/compare modules 120 and 128 can steer the signal transmission by steering vectors or control vectors that can change phase lengths of signal paths and can coherently amplify the desired signals to create beams in the desired direction.

Figure 2:
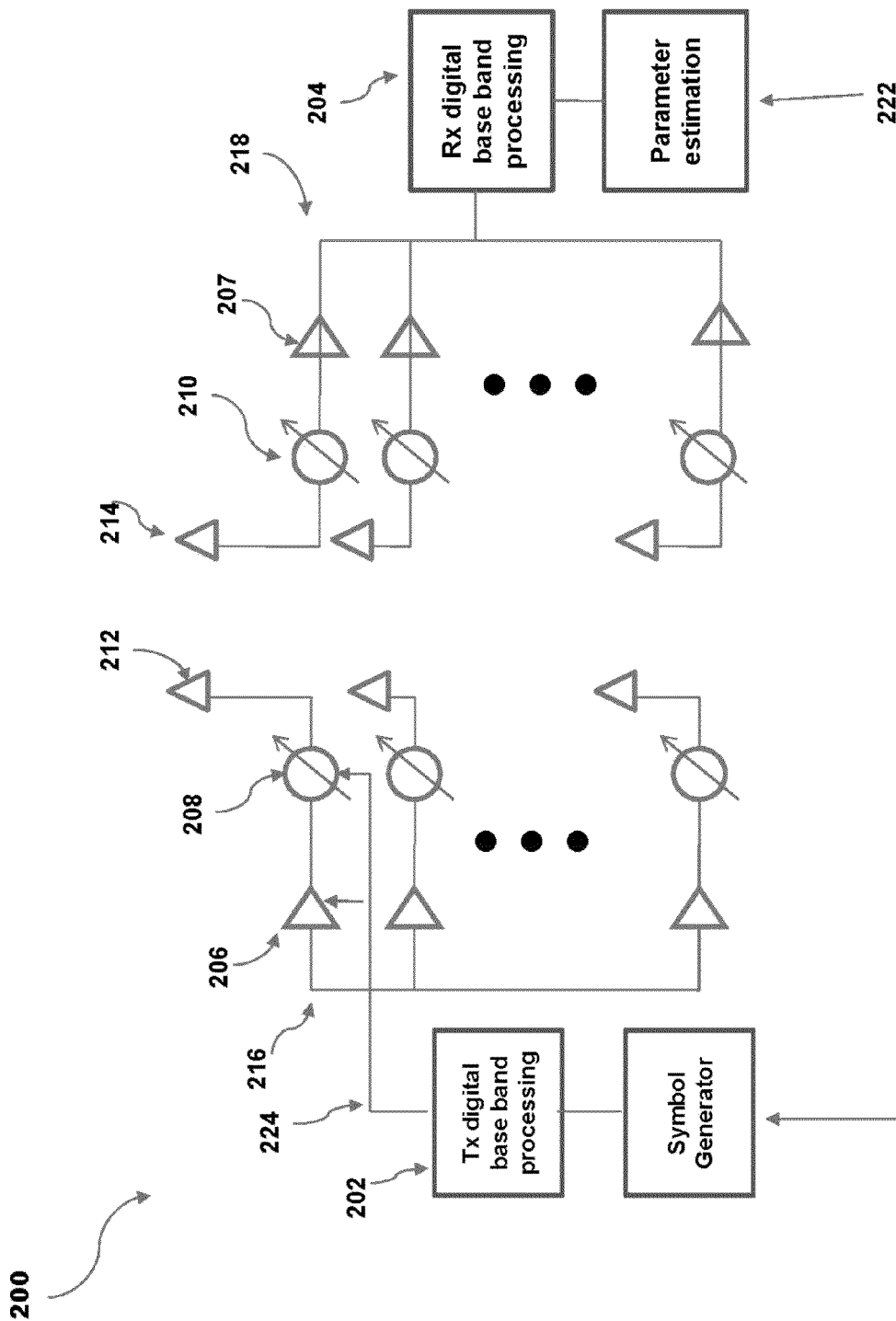
FIG. 2 is a block diagram of a network that can beamform.

Referring to FIG. 2, a system 200 that can achieve beam steering is illustrated in a block diagram format. The system 200 can include a digital baseband transmitter (Tx) 202, a digital baseband receiver (Rx) 204, amplifiers 206 and 207, phase shifters 208 and 210 and antennas 212 and 214. It can be appreciated that, for simplicity, only one transmit path 216 and only one receive path 218 will be described. However, many different paths can be utilized to achieve the desired antenna gain. Generally, the more paths and antennas utilized the more gain that can be achieved by a transmitting or receiving system.

After the "best" sector has been selected (possibly based only on the acquired low SNR) for both the device and the controller, a beam refinement process can be commenced. Beam searching or beam refinement can be performed even in sectors having very low SNR regions. In such regions, long pseudonoise (PN) code symbol sequences called "chips", can be required in order to get the spreading gain to a desirable level. A long PN sequence can be utilized to "pull" the working SNR to a positive region so that the controller and the device can acquire sufficiently accurate channel estimation results. Symbol generator 220 can phase-modulate a sine wave pseudorandomly with the continuous string of PN code symbols, where each symbol has a much shorter duration than an information bit or data. That is, each information bit is modulated by a sequence of much faster chips. Therefore, the chip rate is much higher than the information signal bit rate.

Thus, as part of beamforming, the transmitter 202 can utilize a signal structure in which the sequence of chips produced by the transmitter 202 is known a priori by the receiver 204. The receiver 204 can then use the same PN sequence to counteract the effect of the PN sequence on the received signal in order to reconstruct the information signal and determine the quality of the channel. Parameter estimation module 222 can then estimate channel parameters such as signal to noise ratio of the channel and can perform matrix operations/calculations related to MRC and MRT.

Based on the sector sweeps, acquired parameters and the estimated MRC and MRT, parameter estimation module 222 can call for a tailored PN sequences from the transmitter 202. Such tailored sequences can be a small subset of a traditional symbol transmission. It can be appreciated that control signals 224 can be sent to amplifiers, such as amplifier 206 and phase shifter 208, such that an acceptable beam can be created by the transmitter portion 202 of the system 200 and the receive portion of the system 200. The control signals 224 can be viewed as weights where analog components, such as the amplifiers and phase shifters, can be assigned different weights. A codebook can be a look up table that adjusts weight amplifier settings and phase shifter settings based on calculations, where the adjustments change a location of a beam or move a beam to a particular location based upon acquired parameters and calculations. The codebook controls attempt to converge the transmit and receive beams where the desired and the "optimum" weights can provide the desired beam results. The components illustrated as the transmitter side can present, in both a controller and a device, such that both the controller and the device can achieve beamforming for both their transmit and receive procedures.

One parameter that can affect the SNR as determined by the parameter estimation module 222 in the sector sweep stage (and maybe also the refinement stage) is the quality of calibration of the antenna arrays for the transmitter and/or the receiver. Another factor that can affect the SNR estimation is the efficiency of the "codebook design" or algorithm utilized by the transmitter and/or receiver in the sector sweep process. For example, assuming an un-calibrated phased array with 36 antennas to be utilized in transmitting and receiving, the beamforming gain after the sector sweep can be determined to be around 6 decibels (dB). However, if the phase array is well calibrated and the codebook has an efficient algorithm or the codebook has a good design, the gain after the initial sector sweep can be over 20 dB. Thus, when it is determined by the parameter estimation module 222 that the gain after the sector sweep is 20 dB, the transmitter 202 can be controlled such that the balance of the beam control vector determination process can be omitted or greatly reduced as a minimal number of symbols can be transmitted by the transmitter 202 to complete the beamforming process for the transmitter 202.

Figure 3:
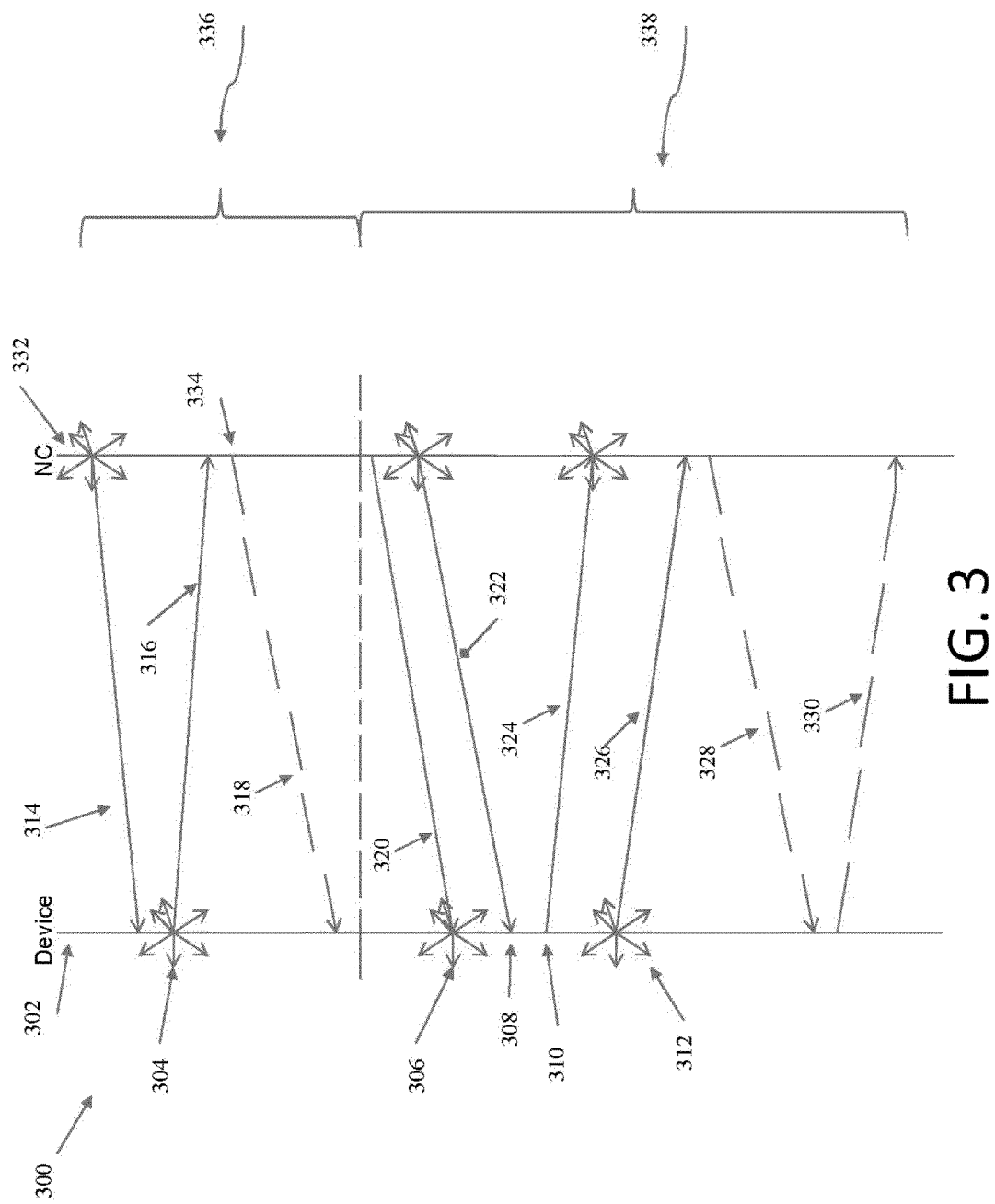
FIG. 3 is a diagram of information exchange between a device and a controller for configuring communications between a controller and a device.

Referring to FIG. 3, a communication session diagram 300 for beam refinement is illustrated. As stated above, due to power requirements, data rates, congestion, interference etc., beamforming is virtually essential for networks utilizing frequencies near the 60 GHz range to communicate. To achieve desirable beams for directional communications, such networks often perform a training procedure to determine control commands that will provide the desired beams. To determine such control commands, network systems commonly utilize a beamforming training sequence. Traditional beamforming methods consume a significant overhead and take a significant amount of time to complete. Traditional or even state of the art beamforming training protocols do not adapt to conditions such as channel qualities or calibration qualities. Thus, current training protocols are designed for and conduct procedures that are to accommodate "worst case" scenarios or poor channel qualities with no calibration.

Therefore, implementing a worst case beamforming procedure every time a device enters the network is a very inefficient usage of available bandwidth because in most cases the channel qualities and calibration qualities are much better than the worst case. FIG. 3 shows one way to adapt the beamforming process so that the spreading length (or training time) is reduced based on calculating MRT and MRC weights.

Network controller NC 332 is illustrated as transmitting and receiving from the right side and device 302 is illustrated as transmitting and receiving from the left side. Transmissions 314 can be a directional transmission as part of a sector sweep from the NC 332 to the device 302, where the 302 can receive in an omni-directional mode. Transmissions 316 from device 302 can be sector sweep transmissions in the form of directional transmissions and such transmissions can carry information, such as channel parameters and directional information acquired, from sector sweep transmissions 314. The NC 332 can receive the directional transmissions in an omni-directional mode and the NC 332 can perform transmissions 318 which have data indicating the "best" sector for the device 302 to utilize and possibly a SNR for the best sector. Transmissions 314, 316, and 318 can be considered as sector search transmissions 336.

As stated above, a sector sweep is generally an initial part of the beamform process where the relative direction of an incoming transmission can be determined by steering a receiving beam to different sectors and determining which sector receives the highest desired signal. More specifically, a sector sweep can be viewed as a process wherein a transmitter and a receiver sequentially try different sectors (sweep different sectors) and measure signal strength for the desired frequency. The sector that receives the highest signal level of a desired frequency can be selected for further analysis. Beamforming vectors (control signals for the amplifiers and phase shifters) can be utilized to control the transmitter and receiver such that the device or controller can utilize the best sector. The configuration can be a configuration as described, defined and stored in a quantization table or codebook. Generally, the quantization codebook can divide channel space into multiple sectors to be tried and monitored (decision regions), hence the name sector sweep. The devices can make use of the MRT and MRC and their results and channel quality and calibration information acquired from the previous steps to optimize subsequent training sequences. For example, if the received SNR in transmission 314 is high, then the sequence length in 316 can be reduced.

After the sector sweep, beam refinement can be attempted. A sector search can be followed by beam refinement stages, such as three stages where the transmitter and receiver beamforming vectors are iteratively brought closer to the optimal vectors. Each beam refinement stage can start with a receive vector training step followed by a transmit vector training step. Steps involved in beam search or beam refinement are shown in FIG. 2. The actions taken in each step are described.

As stated above, beamforming is required to achieve quality communication performance for systems transmitting in the 60 GHz range. However, current beamforming training sequences require a significant overhead and such a process consumes a relatively large amount of time. The more devices entering and leaving a network, the more overhead required to operate a system. Due to the large number of devices often present in a network, and the workload of a typical controller, it is desirable to reduce the beam search overhead in order to achieve higher network efficiency.

In state of the art wireless network systems, the beamforming training protocol does not adapt to either the channel or the calibration qualities and is a regimented process designed for the worst case scenario. Therefore, the beamforming training is not efficient for most of the cases where the channel and calibration qualities are much better than the worst case scenarios.

Training transmissions made after the sector sweep 336 can be referred to as beam refinement iteration stages/transmissions 338 where such transmission 338 includes the PN symbol transmissions. In accordance with the present disclosure, the beam refinement transmissions 338 can be reduced in time and scope based on or commensurate with the MRT and MRC weights parameters acquired during previous transmissions. More specifically, the sequence length can be continually adapted during the beam refinement iteration stages/transmissions 338. The refinement stages 338 can be an iterative process. Each iteration can be customized based on acquired channel parameters, where based on the acquired parameters, control vectors can be selected from a codebook and implemented. Further, the control vectors can be refined in successive iterations to provide higher beamforming gain for each iteration. Sequence lengths can be reduced for each iteration as the number of iterations goes higher. During transmissions 304, 306, 308, 310, 312, 328, and 330 symbols can be transmitted and a SNR measurement can be determined as the beam gets closer to an acceptable or "optimum" range. Transmissions indicated by 320, 322, 324, 326 can include selective vectors that are created via calculations utilizing data that has been acquired during previous iterations.

Figure 4:
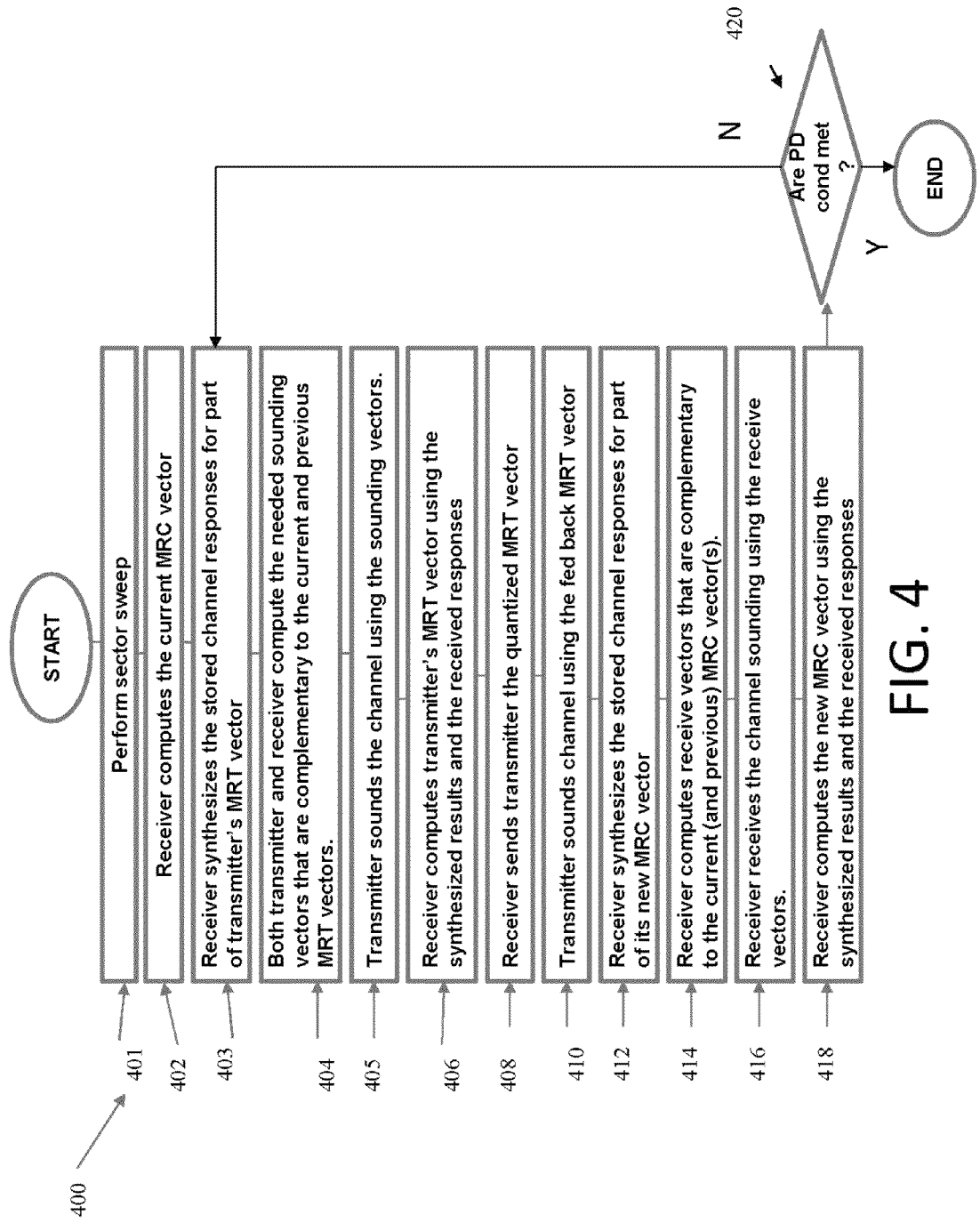
FIG. 4 is a flow diagram illustrating one arrangement for synchronizing networks.

Referring to FIG. 4 a flow diagram 400 depicting a method for beamforming is depicted. Initially, the system can conduct a sector sweep, as illustrated by block 401. Although a sector sweep may allow a power iteration system to converge on an acceptable channel configuration in less time than traditional systems, the sector sweep is an optional feature. It can be appreciated that the disclosed arrangements can start the power iteration process utilizing an arbitrary vector as an initial starting point. As illustrated by blocks 402 a receiver can compute a current MRC vector. The disclosed method continually calculates channel data in an attempt to improve/adjust the gain of the beam formed channel to a "maximum." Such calculations can utilize the following equation:

$$(u, v) = \operatorname*{argmax}_{\|\hat{u}\|=\|\hat{v}\|=1} |\hat{u}^H H \hat{v}| \quad (1)$$

where H is the effective channel matrix between transmitter and receiver and $\hat{u}^H H \hat{v}$ is the beam formed, scalar channel for beamforming weights $\hat{u}$ and $\hat{v}$.

Further, the beamforming weights u and v can be the normalized beamforming vectors at the receiver and transmitter, respectively. The effective channel matrix can incorporate the effects of the inherent transmit/receive weighting matrixes in the wireless channel and the product of the effective channel matrix can be the product of the transmit weighting matrix $B_t$, such as Hadamar matrix, wireless channel $H_w$, and the receive weighting matrix $B_r$, (i.e. $H=B_r H_w B_t$). The weight entries on the i-th row of $B_r$ can form the i-th effective receive antenna and similarly the weight entries on the i-th column of $B_t$ can form the i-th effective transmit antenna.

The entry on the i-th row and j-th column of H can be the channel response between the i-th effective receive antenna and the j-th effective transmit antenna. If H is known, then u and v can be computed utilizing a singular value decomposition of H. However, H is often unknown by both the transmitter and the receiver for 60 GHz wireless systems. It can be appreciated that the results of a sector sweep can provide information that is "equivalent to" or represents one row and one column of the channel matrix. However, a sweep does not provide enough data to populate an entire matrix. A power iteration, as described by equation 2 below, can provide an efficient means to obtain u and v as obtaining results via equation 2 does not require the energy, cause interference or require the costly training overhead as is traditionally expended/caused/required in traditional systems to determine a value for H.

Generally, a power iteration (calculation) can be utilized to determine vectors that can achieve the desired channel quality and desired signal quality for each channel. In some embodiments, an iterative approach that varies the output power vectors can be utilized. Each iteration can have two steps: a transmit vector determination step and a receive vector determination step. As stated above, one step (step 1) can determine MRC weights (receive weights and another step (step 2) can determine maximum ratio transmission (MRT) weights utilizing the equations below:

Step 1: $u(i)=\operatorname{norm}(Hv(i))$

Step 2: $v(i+1)=\operatorname{norm}(H^H u(i))$ \quad (2)

The noise terms have been omitted to simplify the process and the analysis, however, in certain circumstances, the noise terms can be considered at a later stage. At the i-th iteration, the transmitter can utilize the transmit beamforming vector v(i), which has been determined by the receiver and has been sent back to the transmitter as feedback to analyze the MRT weights. As stated above and as illustrated by block 402, in equation two (2), the transmitter can send training symbols to the receiver using v(i) to define the transmission attributes. The receiver can estimate the received beamforming weights that maximize the received signal strength for the transmit vector v(i) (i.e. the MRC weights). The MRC vector can be defined as u(i) and beamforming information from maximum ratio combining, is $u^H(i)Hv(i)$ can be utilized to determine the vector.

As illustrated by block 402, to calculate a MRC vector and MRC weights, the receiver can measure the response to a single transmission from the transmitter on each effective receive antenna in the receiver array. As stated above, and as illustrated by block 403, the receiver can synthesize the stored channel responses for part of the transmitters MRT vector. Measured responses at the receiver can be utilized to create the vector Hv(i) (a vector describing a relative direction of the transmitting source). The receive beamforming vector can produce a directional sensitivity that "maximizes" the signal power received from a particular direction, (i.e. the MRC vector, can be defined as u(i)=norm(Hv(i))), where $$\operatorname{norm}(x) = \frac{x}{\|x\|}$$

normalizes the magnitude of the beamforming vector (converted the vectors to unit vectors).

Referring to block 403, the receiver can synthesize the stored channel responses for part of the transmitters MRT vector. Referring to step two of equation 2, MRT weights can be determined or estimated in subsequent calculations. In some embodiments, the transmitter can send training symbols (possibly a reduced set of symbols) via each of the effective transmit antennas. In response, the receiver can estimate the transmit beamforming weights that "maximize" the received signal strength for the receive vector u(i). To accomplish such an estimate, the receiver can utilize u(i) to define the receive vector and can measure the beamformed channel response for each transmission from each transmit antenna in H. Further, the measured channel responses can be utilized to form the vector $u^H(i)H$. As illustrated by block 404 both the transmitter and the receiver can compute the needed sounding vectors (representing a directional transmissions) that are complimentary to the current and previous MRT vectors.

The transmit beamforming vector that maximizes the received signal, (i.e. the MRT vector), can be determined by solving $v^H(i+1)=\text{norm}(u^H(i)H)$ or $v(i+1)=\text{norm}(H^Hu(i))$. As illustrated by block 405 the transmitter can make a transmission based on the sounding vector. As illustrated by block 406 in response to receiving the signal, the receiver can compute the transmitter's MRT vector using the synthesized results and the received responses. As illustrated by block 408, the receiver can send the quantized MRT vector to the transmitter. Thus, v(i+1) and the MRT vector can be fed back to the transmitter (transmitted back to the transmitter) for the (i+1)-th iteration.

If the codebook or algorithm is efficient the values for u(i) and v(i) will converge to an acceptable or ideal value after some number of iterations. Thus, at any time during the process when a predetermined metric or condition is met the beam training process can end. Such a step is illustrated by decision block 420.

It can be appreciated that at least one training in step 2 (where one or more antennas are not utilized in the power iteration) can be omitted without compromising the end calibration and channel quality. The receiver can conduct $N_r$ measurements, where $N_r$ is the number of receive antennas and the measured response can be stacked to provide the vector Hv(i).

For example, with $v(i)=[1, 0, \ldots, 0]^T$, then $Hv(i)=[h_{1,1},\ldots h_{N_r,1}]^T$. In this example, the first measured response in step 2 of equation 2, (i.e. the first entry of $u^H(i)H$, is $$u^H(i)H[1, 0, \ldots, 0]^T = \frac{(Hv(i))^H}{\|Hv(i)\|}Hv(i) = \frac{\|Hv(i)\|^2}{\|Hv(i)\|} = \|Hv(i)\|, \quad (3)$$

$$\text{where } u(i) = \frac{Hv(i)}{\|Hv(i)\|}$$

is utilized in the equation of the second step. Since Hv(i) is measured in step 1, $\|Hv(i)\|$ it is already is known prior to starting step two and therefore, the first measurement "needed" for step 2 can be eliminated because it is redundant. Namely, the computed normalization factor $\|Hv(i)\|$ in step 1 is actually the result for the first measurement in step 2. Therefore, the first measurement can be skipped or omitted and such an omission can reduce the overhead required to accomplish beamforming.

The above example, i.e $(v(i)=[1, 0, \ldots, 0]^T)$ can be generalized for any v(i). It can be appreciated that in step 2 of equation (2), the MRT vector $H^Hu(i)$ can be determined, (i.e. the optimal transmit vector) v(i+1) for the respective receive vector u(i). In a conventional power iteration, the transmitter can sequentially activate each of the effective transmit antennas and the receiver can measure the beamformed channel response for each of the transmissions.

In some embodiments, the transmitter only needs to send $N_t-1$ training symbols instead of $N_t$ training symbols for the subspace complementary to v(i) because the beamformed channel response for v(i) can readily be synthesized at the receiver as illustrated by block 404. The transmitter can represent the full $N_t$-dimension space for the $N_t$ effective transmit antennas by a square, orthogonal matrix $$F=[v(i)\tilde{v}_1 \ldots \tilde{v}_{N_t-1}] \quad (4)$$

As illustrated by block 406, where v(i), $\tilde{v}_1, \ldots, \tilde{v}_{N_t-1}$ are orthogonal each other and have unit norm. $\tilde{v}_1, \ldots, \tilde{v}_{N_t-1}$ spans the subspace complementary to v(i). It can be appreciated that there are many ways to generate F. One way is to compute the Householder matrix as follows;

$$F = \begin{cases} I - \frac{2w^Hw}{|w^Hw|} & \text{for } w \neq 0 \\ I & \text{for } w = 0, \end{cases} \text{ and } w = \hat{v}(i) - \begin{bmatrix} 1 \\ 0 \\ \vdots \\ 0 \end{bmatrix},$$

where $\hat{v}(i)=e^{-j\theta}v(i)$ and θ the is phase of the first entry of v(i). The synthesized result for v(i) is computed as $$u^H(i)Hv(i) = \frac{(Hv(i))^H}{\|Hv(i)\|}Hv(i) = \frac{\|Hv(i)\|^2}{\|Hv(i)\|} = \|Hv(i)\|. \quad (5)$$

The $N_t-1$ beamformed channel responses (or measurements), can be denoted as $[r_1 \ldots r_{N_t-1}]$, for transmit vectors $\tilde{v}_1, \ldots, \tilde{v}_{N_t-1}$ are expressed as $$[r_1 \ldots r_{N_t-1}]=u^H(i)H[\tilde{v}_1 \ldots \tilde{v}_{N_t-1}]. \quad (6)$$

Combining (5) and (6) provides the equation $$[\|Hv(i)\|r_1 \ldots r_{N_t-1}] = u^H(i)H[v(i) \; \tilde{v}_1 \ldots \tilde{v}_{N_t-1}] \quad (7)$$
$$= u^H(i)HF.$$

From (7), the MRT vector can be computed as $$u^H(i)H = [\|Hv(i)\|r_1 \ldots r_{N_t-1}]F^{-1} = [\|Hv(i)\|r_1 \ldots r_{N_t-1}]F^H \quad (8)$$

and $$v(i+1) = \frac{H^Hu(i)}{\|H^Hu(i)\|} = \frac{F[\|Hv(i)\|r_1 \ldots r_{N_t-1}]^H}{\|F[\|Hv(i)\|r_1 \ldots r_{N_t-1}]^H\|},$$

where $F^HF=I$ and $F^H=F^{-1}$ can be utilized. In some embodiments, the receiver can quantize the vector v(i+1) and feed back the quantization index (a new MRT vector) to the transmitter because the receiver can acquire v(i) and construct F. Thus, both the transmitter and the receiver can acquire F and the receiver can provide data about the new quantized MRT vector as feedback, as illustrated by block 408. In some embodiments, the receiver can feedback the $[\|Hv(i)\|r_1 \ldots r_{N_t-1}]$, data then the transmitter can compute the MRT vector v(i+1) using equation (8) because F is available to or can be acquired by the transmitter. As illustrated by block 410, the transmitter can transmit over the channel responsive to the MRT vector that has been received via a feedback transmission from the receiver.

In some embodiments and for some systems, the receiver can provide feedback to the transmitter where the feedback only includes quantized phase information as the magnitude information can be withheld from the transmission. The transmitter can transmit a constant power for each physical antenna and in such a case, the generation of F can be simplified. The transmitter can replace $B_t$ with a orthogonal matrix F whose first column is v(i). F can be converted from a constant matrix $F_0$. $F_0$ can be an orthogonal matrix whose entry has a constant modulus and whose first column is $[1, \ldots, 1]^T$. It can be appreciated that there are many other ways to generate $F_0$. For one example, $F_0$ can be the Hadamar matrix like $$\begin{bmatrix} 1 & 1 & 1 & 1 \\ 1 & 1 & -1 & -1 \\ 1 & -1 & -1 & 1 \\ 1 & -1 & 1 & -1 \end{bmatrix}.$$

In other embodiments, $\tilde{F}_0$ can be an orthogonal matrix with a constant entry modulus where $\tilde{F}_0$'s first column is not $[1, \ldots, 1]^T$. $\tilde{F}_0$ can be converted to an orthogonal matrix $F_0$ with a first column of $[1, \ldots, 1]^T$. The phase of each row of $\tilde{F}_0$ can be rotated such that the first entry has zero phase as $F_0 = \text{diag}(f_1^H)\tilde{F}_0$, where $f_1$ is the first column of $\tilde{F}_0$ and diag(x) is a diagonal matrix with the entries of vector x as the diagonal entries. Using the $F_0$ with $[1, \ldots, 1]^T$ as the first column, the transmitter can compute F by a simple phase rotation as $$F = \text{diag}(v(i))F_0 = [v(i)\tilde{v}_1 \ldots \tilde{v}_{N_t-1}], \quad (9)$$

where diag(x) is a diagonal matrix with the entries of vector x as the diagonal entries. Since v(i) has entries with a constant modulus, it follows that diag(x) is an orthogonal matrix. Thus, F is an orthogonal matrix because it is the product of two orthogonal matrixes. Furthermore, since the first column of $F_0$ is $[1, \ldots, 1]^T$, it is also the first column of F or v(i). Namely, F can have the form of equation (4) and the transmitter can transmit over the channel using the columns 2, . . . , $N_t$ as illustrated by block 410. The training results for v(i) can be saved, and utilized in future calculations. The receiver can synthesize the stored channel parameters for part of its new MRC vector as illustrated by block 412. It can be appreciated that saving/using/re-using such results is distinctly different from conventional power iteration systems and teachings that drop or ignore such parameters. Not transmitting data between the transmitter and the receiver that is known by either from previous iterations or is obtainable by other means can provide a reduced training protocol. As illustrated by block 414 the received can compute receive vectors that are complementary to the current and previous MRC vector.

As disclosed above, training time and energy is saved with improved results by computing the MRC at the receiver. Training results from one or more previous iterations (MRC weights) can be saved and utilized in successive iterations to increase the accuracy of each iteration. For each iteration, the transmitter of the training signal or feedback can determine a selective transmission that has a vector that will provide the needed information. Such a transmission could be a subset of what a traditional system would transmit. The results of previous trainings can include the receiver's detection of channel parameters or responses of the beam formed transmit vectors (i.e. MRC and MRT). A new MRC vector can be calculated using $$v(j) \text{ for } j=1, \ldots, k, \text{ i.e. } r(j)=Hv(j).$$

Similarly, the beamformed channel responses for receive vectors u(i) for i=1, . . . , l, i.e. $\gamma(i)=H^H u(i)$ can also be saved during previous training cycles. Even without synthesizing the result at the receiver, using the stored results of the previous training can increase estimation accuracy because the measured results typically contain noise data or noise measurement data and, combining these results or utilizing this data can provide improved accuracy in channel calculations. It can be appreciated that traditional systems or traditional processes discard all previous results or noise data.

In the power iteration provided by the MRC weight estimate at block 414, the receiver can compute a new vector $v_{k+1}$ for the next training cycle based on some criterion, such as maximum beamforming gain, and the receiver can determine the beamforming channel response vector Hv(k+1) for further iterations. In such a determination, $v(k+1)=v_s+v_\perp$ where $v_s$ can be the component of v(k+1) staying in the subspace spanned by the previous trained vectors v(j), j=1, . . . , k; $v_\perp$ is the component of v(k+1) orthogonal to the subspace spanned by the previous trained vectors. Since $v_s$ is in the subspace, $v_s$ can be written as $$v_s = \sum_j \alpha_j v_j.$$

Therefore, the channel response to $v_s$ can be computed as $$Hv_s = \sum_j \alpha_j Hv(j) = \sum_j \alpha_j r(j)$$

and such data can exist in memory of the receiver as a result of previous trainings.

Therefore, the transmitter only needs to send training symbols using $v_\perp$ not $v_s$ to accomplish the desired computations. In some embodiments, the receiver only needs to send the feedback for $v_\perp$ to the transmitter and $Hv_\perp$ can be measured at the receiver. The channel response for v(k+1) can then be computed utilizing $$Hv(k+1) = H(v_s + v_\perp) = \sum_j \alpha_j r(j) + Hv_\perp. \quad (10)$$

It should be noted that the receiver can acquire and store all information acquired and stored by the transmitter because information at the transmitter typically is what has been fed back by the receiver and vice versa. If the computation algorithm of $v_\perp$ and $v_s$ is known at both the transmitter and the receiver, the receiver knows everything about the transmitter and vice versa. Therefore, in some embodiments, the receiver can compute the MRT vector v(k+1), quantize it, and feed it back to the transmitter.

In a traditional power iteration methods, Hv(k+1) is directly measured and the transmission power is split into two directions $v_s$ and $v_\perp$. It can be appreciated that a portion of $v_s$ is wasted because the result is known at the receiver before the training. Since $v_s$ wastes some power, the desired direction $v_\perp$ doesn't include the full transmission power. It can be appreciated that training time can be proportional to the signal power utilized. Therefore, in this case the training time can be prolonged because the transmission power is limited and the signal to noise ratio (SNR) in the $v_\perp$ direction should be above a predetermined threshold to achieve reliable results. The $v_s$ component of v(k+1) in the conventional power iteration typically wastes about 30% of the power. In contrast, the disclosed arrangement puts all of the power in the required direction and thus the training time is significantly reduced.

A similar modification can be applied to the MRT power iteration step. The receiver can compute a new vector u(l+1) for the next training based on some criterion when the receiver wants to know the beamformed channel response vector $H^H$u(l+1) for further iterations. Assume u(l+1)=$u_s$+$u_\perp$ where $u_s$ is the component of u(l+1) staying in the subspace spanned by the previous trained vectors u(i), i=1, ..., l. $u_\perp$ can be the component of u(l+1) orthogonal to the subspace spanned by the previous trained vectors. Since $u_s$ is in the subspace, $u_s$ can be written as $$u_s = \sum_i \beta_i u_i.$$

Therefore, the beamformed channel response to $u_s$ can be computed as $$H^H u_s = \sum_i \beta_i H^H u(i) = \sum_i \beta_i \gamma(i)$$

and,
the desired value can be determined at the receiver based on the previous training. Therefore, the receiver may only need to receive the training symbols using $u_\perp$ not $u_s$. The channel response for u(l+1) can then be computed as $$H^H u(l+1) = H^H (u_s + u_\perp) = \sum_i \beta_i \gamma(i) + H^H u_\perp. \quad (11)$$

As illustrated by block 416, the transmitter can transmit a beam based on the estimated channel and the receiver can receive this channel transmission utilizing the estimated receiver vectors. As illustrated by block 418 the receiver can compute the new MRC vector utilizing the synthesized results and the received responses.

In some embodiments, either the receiver (or the transmitter) doesn't remove the measurement for $v_s$ (and/or $u_s$). However, the disclosed scheme may require some coordination between the transmitter and the receiver regarding use and re-use of data. In some embodiments, a transceiver can follow the legacy power iteration utilized by traditional transceivers and may not recognize the disclosed/improved arrangements. In such a case, the transmitter (or the receiver) can still send or receive signals falling into the previously measured subspace $v_s$ (or $u_s$). Storing the previous measurements can help, even in such a case. The transceiver may not remove the measurement in the $v_s$ (or $u_s$) as in the previous case, but the transceiver can enhance the accuracy of the previous measurements in $v_s$ (or $u_s$) for noisy channels. It can be appreciated that there are many ways to combine the signal for the same $v_s$ (or $u_s$) such as maximum ratio combining and equal gain combining.

As illustrated by block 420 it can be determined if one or more predetermined conditions are met. If these conditions are met the process can end and if the conditions are not met the process can iterate back to block 403 where the receiver can synthesize the stored channel responses and the process can iterate until the conditions are met. In some embodiments, the predetermined conditions can be a number of iterations. Thus, the system can count iterations and after a fixed number of iterations, the beam refinement process can be terminated regardless of the convergence. This predetermined metric can be a statistically based number where such a number of iterations nearly always provides acceptable results. In other embodiments, the SNR of a/the channel(s) can be monitored and once a predetermined SNR measurement is achieved, the beam refinement process can be terminated. Thus, some predetermined criteria can be utilized to terminate the beam refinement process, and termination can occur when the conditions are met.

Utilizing the above arrangements, simulation results for non-line of sight (NLOS) channels have been conducted without antenna correlation assuming best case timing. With the disclosed arrangements, acceptable communication channels can be created faster than the conventional power iteration arrangements. Typically, the beamforming process can increase the power of the received signal about 30 dB, which can be the difference between quality communications and extremely poor communications. Beamforming is generally more important for achieving directional communications, (via a sector search and beam refinement), for systems without a calibrated transceiver chain. In the state of the art systems, power iteration methods are generally the most efficient beam refinement process and such a process has been adopted by existing standardized protocols such as WiHD.

Each process disclosed herein can be implemented with a software program. The software programs described herein may be operated on any type of computer, such as personal computer, server, etc. Any programs may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer-readable instructions that direct the functions of the present disclosure, represent embodiments of the present disclosure.

The disclosed embodiments can take the form of an entirely hardware embodiment, an entirely software embodiment or an embodiment containing both hardware and software elements. In some embodiments, the methods disclosed can be implemented in software, which includes but is not limited to firmware, resident software, microcode, etc. Furthermore, the embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

System components can retrieve instructions from an electronic storage medium. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD). A data processing system suitable for storing and/or executing program code can include at least one processor, logic, or a state machine coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure, that the disclosure contemplates methods, systems, and media that can provide the above mentioned features. It is understood that the form of the embodiments shown and described in the detailed description and the drawings are to be taken merely as possible ways to build and utilize the disclosed teachings. It is intended that the following claims be interpreted broadly to embrace all the variations of the example embodiments disclosed.

What is claimed is:

1. A method comprising:
   determining, by a receiver, at least part of a maximum ratio combining (MRC) vector based on stored channel data and at least part of a first maximum ratio transmission (MRT) vector based on stored channel data;
   receiving, by the receiver, a first sounding vector based on the at least part of the first MRT vector and a second sounding vector utilizing the MRC vector, wherein the MRC vector is determined based on the at least part of the MRC vector and measurement of the first sounding vector;
   determining, by the receiver, a parameter of the second sounding vector;
   transmitting, by the receiver, the parameter back to a source; and
   receiving, by the receiver, a directional transmission based on the parameter and the first MRT vector, wherein beamforming is terminated when a predetermined condition is met.

2. The method of claim 1, further comprising receiving communications from the source as part of a sector sweep, wherein stored channel data comprises channel data determined based on the sector sweep.

3. The method of claim 1, wherein receiving the second sounding vector comprises receiving the second sounding vector, wherein the second sounding vector is complimentary to a current and previous MRT vector.

4. The method of claim 1, wherein determining the parameter comprises determining a beamformed channel gain, a quantized MRT vector based on the first MRT vector, or a computed component that is transmitted back as part of a MRT vector that is orthogonal to the first MRT vector.

5. The method of claim 1, wherein determining the parameter comprises computing, by the receiver, a second MRT vector and sending the second MRT vector to the source, wherein the source is a communications controller.

6. The method of claim 1, wherein determining the parameter comprises determining a synthesized result and wherein transmitting the parameter comprises transmitting the synthesized result to the source to facilitate computation of a second MRT vector based on the synthesized result.

7. An apparatus comprising:
   a device to determine at least part of a maximum ratio combining (MRC) vector based on stored channel data; to determine at least part of a first maximum ratio transmission (MRT) vector based on stored channel data; and to determine a parameter of the second sounding vector;
   wherein the device comprises a receiver to receive a first sounding vector based on the at least part of the first MRT vector; to receive a second sounding vector utilizing the MRC vector, wherein the MRC vector is determined based on the at least part of the MRC vector and measurement of the first sounding vector; and to receive a directional transmission based on the parameter and the first MRT vector; and
   wherein the device comprises a transmitter to transmit the parameter back to a source.

8. The apparatus of claim 7, wherein the device is configured to receive communications from the source as part of a sector sweep, wherein stored channel data comprises channel data determined by the device based on the sector sweep.

9. The apparatus of claim 7, wherein the device is configured to determine a quantized MRT vector based on the first MRT vector as the parameter.

10. The apparatus of claim 7, wherein the device is configured to determine a beamformed channel gain as the parameter.

11. The apparatus of claim 7, wherein the device is configured to determine a computed component that is transmitted back as part of a MRT vector that is orthogonal to the first MRT vector as the parameter.

12. A computer program product including a computer readable storage medium including instructions that, when executed by a processor cause the computer to:
   determine at least part of a maximum ratio combining (MRC) vector based on stored channel data and at least part of a first maximum ratio transmission (MRT) vector based on stored channel data;
   receive a first sounding vector based on the at least part of the first MRT vector and a second sounding vector utilizing the MRC vector, wherein the MRC vector is determined based on the at least part of the MRC vector and measurement of the first sounding vector;
   determine a parameter of the second sounding vector;
   transmit the parameter back to a source; and
   receive a directional transmission based on the parameter and the first MRT vector, wherein beamforming is terminated when a predetermined condition is met.

13. The computer program product of claim 12 that, when executed by a processor, causes the computer to synthesize the at least part of the MRC vector and the at least part of the first MRT vector at the receiver.

14. A method comprising:
   determining, by the transmitter, at least part of a first maximum ratio transmission (MRT) vector based on stored channel data;
   transmitting, by the transmitter, a first sounding vector based on the at least part of the first MRT vector and a second sounding vector;
   receiving, by the transmitter, a parameter of the second sounding vector; and
   transmitting, by the transmitter, a directional transmission based on the parameter and the first MRT vector.

15. The method of claim 14, further comprising receiving communications from the source as part of a sector sweep, wherein stored channel data comprises channel data determined based on the sector sweep.

16. The method of claim 14, further comprising terminating the beamforming when a predetermined condition is met, the predetermined condition being one of a convergence of subsequent MRT and MRC vectors, performing a predetermined number of steps, or reaching a signal to noise ratio.

17. The method of claim 14, wherein transmitting the second sounding vector comprises transmitting the second sounding vector, wherein the second sounding vector is complimentary to a current and previous MRT vector.

18. The method of claim 14, wherein receiving the parameter comprises receiving a synthesized result to facilitate computation of a second MRT vector based on the synthesized result.

19. The method of claim 14, wherein transmitting the directional transmission comprises transmitting vectors determined from one of the first MRT vector and the MRC vector that was utilized in a previous transmission or calculation.

20. An apparatus comprising:
a device to determine at least part of a first maximum ratio transmission (MRT) vector based on stored channel data;
wherein the network controller comprises a receiver to receive a parameter of the second sounding vector; and
wherein the network controller comprises a transmitter to transmit a first sounding vector based on the at least part of the first MRT vector and a second sounding vector and to transmit a directional transmission based on the parameter and the first MRT vector.

21. The apparatus of claim 20, wherein the receiver is configured to receive the parameter, wherein the parameter is a beamformed channel gain.

22. The apparatus of claim 20, wherein the network controller is configured to terminate beamforming in response to a predetermined condition, wherein the predetermined condition is a convergence of a transmit weight vector and a receive weight vector.

23. A computer program product including a computer readable storage medium including instructions that, when executed by a processor cause the computer to:
determine at least part of a first maximum ratio transmission (MRT) vector based on stored channel data;
transmit a first sounding vector based on the at least part of the first MRT vector and a second sounding vector;
receive a parameter of the second sounding vector; and
transmit a directional transmission based on the parameter and the first MRT vector.

24. The computer program product of claim 23 that, when executed by a processor, causes the computer to transmit communications as part of a sector sweep.

25. The computer program product of claim 23 that, when executed by a processor, causes the computer to terminate the beamforming in response to the detection of a predefined condition.

* * * * *